US008416773B2

United States Patent
LaVigne et al.

(10) Patent No.: US 8,416,773 B2
(45) Date of Patent: Apr. 9, 2013

(54) PACKET MONITORING

(75) Inventors: Bruce E. LaVigne, Roseville, CA (US);
Joseph A. Curcio, Jr., Folsom, CA
(US); Mauricio Sanchez, Roseville, CA
(US)

(73) Assignee: **Hewlett-Packard Development
Company, L.P.**, Houston, TX (US)

(*) Notice: Subject to any disclaimer, the term of this patent is extended or adjusted under 35 U.S.C. 154(b) by 1134 days.

(21) Appl. No.: 11/827,293

(22) Filed: Jul. 11, 2007

(65) Prior Publication Data

US 2009/0016226 A1 Jan. 15, 2009

(51) Int. Cl.
*H04L 12/56* (2006.01)

(52) U.S. Cl.
USPC .......................................... 370/389; 370/392

(58) Field of Classification Search .................. None
See application file for complete search history.

(56) References Cited

U.S. PATENT DOCUMENTS

| | | | |
|---|---|---|---|
| 6,233,686 B1 * | 5/2001 | Zenchelsky et al. .............. 726/1 |
| 6,763,018 B1 | 7/2004 | Puthiyandyil et al. | |
| 7,058,821 B1 * | 6/2006 | Parekh et al. ................. 713/194 |
| 7,103,045 B2 | 9/2006 | Lavigne et al. | |
| 7,111,072 B1 | 9/2006 | Matthews et al. | |
| 7,159,242 B2 | 1/2007 | Genty et al. | |
| 7,685,254 B2 * | 3/2010 | Pandya ......................... 709/217 |
| 2002/0198981 A1 * | 12/2002 | Corl et al. ..................... 709/224 |
| 2005/0097358 A1 * | 5/2005 | Yanovsky ..................... 713/201 |
| 2005/0114522 A1 | 5/2005 | LaVigne et al. | |
| 2005/0220091 A1 | 10/2005 | LaVigne et al. | |
| 2005/0220092 A1 | 10/2005 | LaVigne et al. | |
| 2006/0013136 A1 * | 1/2006 | Goldschmidt et al. ........ 370/235 |
| 2006/0168273 A1 * | 7/2006 | Michael ....................... 709/230 |
| 2006/0191008 A1 * | 8/2006 | Fernando et al. .............. 726/23 |
| 2007/0056028 A1 * | 3/2007 | Kay ............................... 726/11 |
| 2007/0110053 A1 * | 5/2007 | Soni et al. .................... 370/389 |
| 2007/0230445 A1 * | 10/2007 | Barrie et al. ................. 370/352 |
| 2008/0101222 A1 * | 5/2008 | Christenson ................. 370/230 |
| 2008/0201772 A1 * | 8/2008 | Mondaeev et al. ............. 726/13 |
| 2009/0323703 A1 * | 12/2009 | Bragagnini et al. .......... 370/401 |

* cited by examiner

Primary Examiner — Marsha D Banks Harold
Assistant Examiner — Anthony Sol

(57) ABSTRACT

Network devices, systems, and methods are provided for packet processing. One network device includes a network chip having logic and a number of network ports for the device for receiving and transmitting packets therefrom. The logic is encoded with application specific integrated circuit (ASIC) primitives to check header fields and payload content in the packets.

18 Claims, 6 Drawing Sheets

PACKET MONITORING

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include a network appliance, e.g., intrusion prevention system (IPS) and/or intrusion detection system (IDS) that serves to detect unwanted intrusions/activities to the computer network. Unwanted network intrusions/activities may take the form of attacks through computer viruses and/or hackers, among others, trying to access the network. To this end, a network appliance can identify different types of suspicious network traffic and network device usage that can not be detected by a conventional firewall. This includes network attacks against vulnerable services, data driven attacks on applications, host-based attacks such as privilege escalation, denial of service attacks, port scans, unauthorized logins and access to sensitive files, viruses, Trojan horses, and worms, among others. A network appliance can also include other forms of diagnostic devices, accounting devices, counting devices, etc., operable on network packets of interest.

Network appliances are a class of products that provide network security services such as firewalling, intrusion detection, content filtering, spam filtering, and/or virtual private networks (VPNs). Network appliances arose and evolved independently of traditional high-speed network infrastructure devices such as routers, switches, bridges, etc. However, the underpinnings of modern network appliances are in fact a bridging or routing engine that in many instances replicates the functionality of the traditional high-speed network infrastructure device.

Network appliances, e.g., IPS/IDSs, counting/accounting, or diagnostic devices, may be slower than other network devices, such as switches and routers, and hence have slower throughput. Additionally, network appliances tend to replicate bridging and routing functions that have already been well-optimized and are significantly faster in network infrastructure devices, e.g., routers, switches, etc. For example, network devices have become more "intelligent" in their decision making capability at very fast speeds, e.g., 100+ Gbps. In contrast, network appliances can be several orders of magnitude slower in terms of throughput as compared to such modern high-speed network devices. Thus, network appliances tend to introduce latency issues when compared to network devices. Latency is a troublesome facet to introduce into a network because it negatively effects real time applications such as voice over Internet protocol (VoIP), e.g., latency can cause choppiness in conversations, etc., or storage area networks (SANs), e.g., latency can cause slow file operations.

Previous approaches have endeavored to put more processing power in the network appliance. However, while adding more raw processing power to a network appliance can improve its capability, the net return on improvement does not usually justify the cost added to realize that improvement.

DETAILED DESCRIPTION

Figure 1:
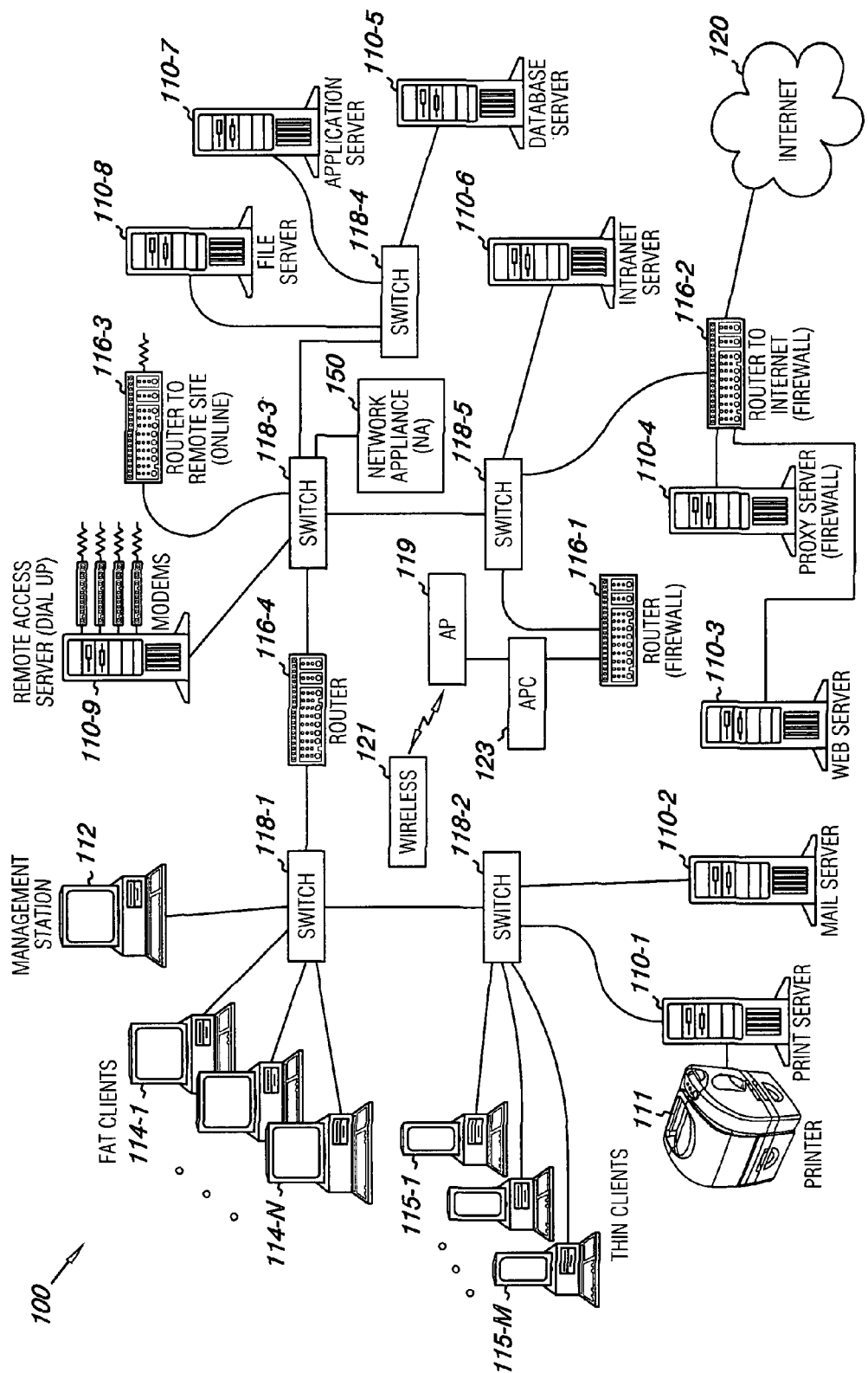
FIG. 1 is an example of a computing device network in which certain embodiments of the invention can be implemented.

The set of possible virus signatures is ever-increasing, requiring a relatively large quantity of rules to detect a given virus. Security appliances examine network packets and flows of packets. However, security appliances tend to be slow relative to current network speeds, with the performance gap widening. Increasing security appliance capacity, and/or capability, to check all network data is expensive. One solution has been to only check some portion of the total packet traffic, i.e., sample, commensurate with the security appliance capacity/capability. Another solution limits the network traffic rate to the maximum security appliance rate so that all traffic is checked.

According to certain implementations of the present invention, a list of virus signatures is processed to arrive at a coarse set of rules. The rule set is configured to be overly pessimistic (i.e., conservative, inclusive, etc.) so as not to miss packets which contain viruses. However, this approach may also select packets which are not part of a virus. Some portion of the full rule set can be scanned for in switch hardware, the scope of the portion depending on hardware capabilities and size of the rule set. If the entire set of rules is too voluminous to be entirely implemented by hardware, the signatures may be prioritized or summarized into more general rules, thus enabling the most likely (or most recent, or most dangerous, or some other prioritization criteria) viruses to be scanned for in hardware. This method of prioritized scanning in hardware can be done at much higher rates than scanning by the security appliances alone, thus protecting a greater portion of the network in a cost effective manner.

Embodiments of the present invention may include network devices, systems, and methods for packet checking, e.g., a security signature engine. Top security threats are reduced into an initial coarse signature, scanned for at hardware rates. Packet classification is refined by a further process, e.g., at a centralized checking functionality, if the initial coarse signature matches. The coarse rule set may be some number of the rules contained in full rule set, or a more inclusive, i.e., broader, rule set derived from commonalities among a number of rules of the full rule set.

One embodiment of a network device includes a network chip having a number of network ports for the device for receiving and transmitting packets therefrom, and logic which is encoded with application specific integrated circuit (ASIC) primitives to check header fields and payload content in the packets. In certain embodiments, the logic can perform pattern matching on the header fields and the payload content, such as according to a number of complete rules included in a subset of rules from among all rules offered in association with a checking functionality.

In some embodiments, the logic can prioritize the application of the number of complete rules according to a hierarchy.

The logic can dynamically adjust which complete rules are included in the subset of rules and the hierarchy in which the subset of rules is applied to packets. The logic is operable to apply a remedial action to packets based on application of the number of complete rules in the subset of rules in certain embodiments. In another embodiment, the logic is encoded with ASIC primitives that provide a blend of rules to apply to packets according to a number of commonalities from among all rules offered in association with a checking functionality. Embodiments described herein allow for the coordination of checking functionality and a network device by efficient packet screening to reduce packet checking work duplication and thereby, increase performance.

As used herein, "checking functionality" (CF) means an intrusion prevention system (IPS), an intrusion detection system (IDS), and can also include other forms of security devices, diagnostic devices, accounting devices, counting devices, etc., operable on network packets of interest, whether connected as a network appliance (e.g., 250-1 or 250-2 as described in connection with FIG. 2) or whether provided as logic integral to a particular network device (e.g., 241, 270, 260, or 265, as described in connection with FIG. 2).

A checking functionality can include a network appliance supplied by a third party vendor of network security devices or otherwise. As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. The operations of such devices will be recognized and understood by one of ordinary skill in the art. A checking functionality can be provided in the form of software, application modules, application specific integrated circuit (ASIC) logic, and/or executable instructions operable on the systems and devices shown herein or otherwise.

"Software", e.g., computer executable instructions as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

In some embodiments, software and/or logic in the form of hardware, e.g. ASICs on a network chip, receives a network packet. The software and/or logic processes network packets on ingress to a network chip (defined below), e.g., using a first logical entity ASIC for processing well-known packet header information, such as layer 2 to layer 7, associated with the network packets. In other embodiments, the software and/or logic processes network packets on ingress to the network chip, e.g., using a first logical entity ASIC for processing well-known packet header information, such as layer 2 to layer 7, associated with the network packets, in order to determine whether a number of pre-conditions, derived from the full rule set as generalized selection criteria from a blended algorithm, e.g., such as data content matching using more inclusive selection criteria, have been met before higher orders of analysis, such as data content matching using more specific selection content, are invoked on the network packets by a second logical entity, e.g., a checking functionality. The software and/or logic is further operable to establish a bi-directional communication path between the first logical entity and the second logical entity for subsequent processing of selected packets.

According to embodiments, the software and/or logic can dynamically configure the first logical entity with the rule subset or number of pre-conditions, e.g., generalized selection criteria, derived from the full rule set. For example, the rule set, and thus the rule subset and/or pre-conditions rules, are designed to evaluate network packet characteristics selected from the group of: a physical source port, a source media access controller (MAC_SA) address, a destination media access controller (MAC_DA) address, a source IP address (IP SA), a destination IP address (IP DA), a protocol ("traffic") type, a TCP/UDP source port number, a TCP/UDP destination port number, an IP flow, a port being connected to a wireless network, data pattern match, among others. The software and/or logic can configure the first logical entity with a prioritized subset of pattern indices associated with the above-mentioned network packet characteristics, priority determined from criteria such as most recent threat, most dangerous threat, most prevalent historical threat, etc. Embodiments, however, are not limited to using pattern indices to perform pattern matching, but can include sample based analysis and behavioral analysis, etc.

As explained in more detail below, embodiments of the present invention use a filter and/or blend algorithm to execute instructions to decide how to efficiently prioritize, characterize, and/or generalize a rule set used for checking network packets, and how to distribute packet analysis between different entities, e.g., a checking functionality and a particular switch, in a given network.

In some embodiments, the checking functionality only operates, e.g., performs pattern searches, on packets when one of a number of rules of the rule set is satisfied, as determined by the network device hardware circuits. In other embodiments, the checking functionality only operates, e.g., performs pattern searches, on packets when pre-conditions, e.g., generalized selection criteria derived from commonalities between multiple rules of the rule set, has been satisfied. Using the bi-directional communication path, the checking functionality communicates a status associated with packets which have been operated on to the network device. The network device can then operate on network packets based on the status communicated from the checking functionality. According to some embodiments, the checking functionality can operate on a set of pattern indices associated with packet traffic and communicate a status back to the network device without processing the same packet information already processed by the first logical entity. Hence, embodiments of the present invention focus the efforts of the checking functionality on the packet checking role while not necessarily duplicating the packet processing functionality of the network device to improve throughput and reduce latency issues for the network.

FIG. 1 illustrates an embodiment of a computing device network 100 in which some embodiments of the invention can be implemented. As shown in FIG. 1, a number devices can be networked together in a LAN, WAN and/or metropolitan area network (MAN) via routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

As used herein, a "network" can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

The example network of FIG. 1 illustrates a print server 110-1 and printer 111 to handle print jobs for the network 100, a mail server 110-2, a web server 110-3, a proxy server (firewall) 1104, a database server 110-5, an intranet server 110-6, an application server 110-7, a file server 110-8, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 1164, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or quantity of network devices illustrated in FIG. 1.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

Program instructions (e.g., computer executable instructions), as described in more detail here, can reside on some network devices. For example, program instructions in the form of firmware, application modules, and/or software (both in the form of executable instructions) can be resident on the network 100 in the memory of a network management station 112 and/or one or more routers, 116-1, 116-2, 116-3, 116-4, hubs, and/or switches 118-1, 118-2, 118-3, 118-4, 118-5, etc., and can be executable by the processor(s) and/or logic (e.g., hardware in the form of transistor gates) thereon. Also, program instructions can be resident in a number of locations on some network devices in the network 100 as can be employed in a distributed computing network. A "distributed computing network" refers to the use of multiple computing devices, e.g., having processor and memory resources, in a network to execute various roles, e.g., application processing, etc., as described herein.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, as associated with ports on a network device. A network switch forwards network packets received from a transmitting network device to a destination network device based on the header information in received network packets. A network device can also forward packets from a given network to other networks through ports on one or more other network devices. As the reader will appreciate, an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, . . . , 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge network devices" and other network devices, e.g., switches 118-3 and router 116-4, may be referred to topographically as "central network devices". As used herein, "edge network devices" topographically means network devices, e.g., 118-1, having ports connected directly to network clients, 115 and 114-1, . . . , 114-N on the "edge" of a network. The network clients can include servers, "fat" and "thin" clients, including mobile network clients connected through an APC, etc., as discussed above. As used herein, "central network devices" topographically means network devices, e.g., 118-3, which are connected to other network devices, 118-2, but which are not necessarily connected directly to network clients such as 115 and 114-1, . . . , 114-N, etc.

However, the term "central" in central network devices is not to be confused with the use of the term "centralized". In some embodiments, a "centralized" CF, as defined above, may be integral to or associated with an edge network device. That is, the topographical location in a given network of the CF can be in association with switch 118-1, connected to "fat" and "thin" clients, 114-1, ..., 114-N, and 115-1, ..., 115-M, in FIG. 1, or equally in association with switch 118-3, or switch 118-5, etc. Embodiments are not limited to the examples described herein. As one or ordinary skill in the art will appreciate, the intent is to place a CF in a topographical location in network 100 which has a sufficiently high bandwidth associated therewith relative to the bandwidth of other devices attached to the network 100 to perform a sufficient throughput associated with a particular CF. As the reader will appreciate, certain so termed "edge network devices", e.g., switch 118-1, may in fact have a large network packet traffic bandwidth capability relative to other network devices, e.g., 118-3, 118-4, etc., in the network 100 so as to be worthwhile candidates for associating a CF therewith. Embodiments are not limited to the examples given in connection with FIG. 1.

In the example network implementation of FIG. 1, a network appliance 150 is shown in association with switch 118-3. The network appliance 150 serves as a checking functionality. As the reader will appreciate, a network appliance 150 can include processor and memory resources capable of storing and executing instructions to perform a particular role or function. A network appliance can also include one or more network chips (e.g., ASICs) having logic and a number of ports.

In certain embodiments, the checking functionality performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The various configurations and operations of such different checking functionalities are known and understood by one of ordinary skill in the art.

Figure 2:
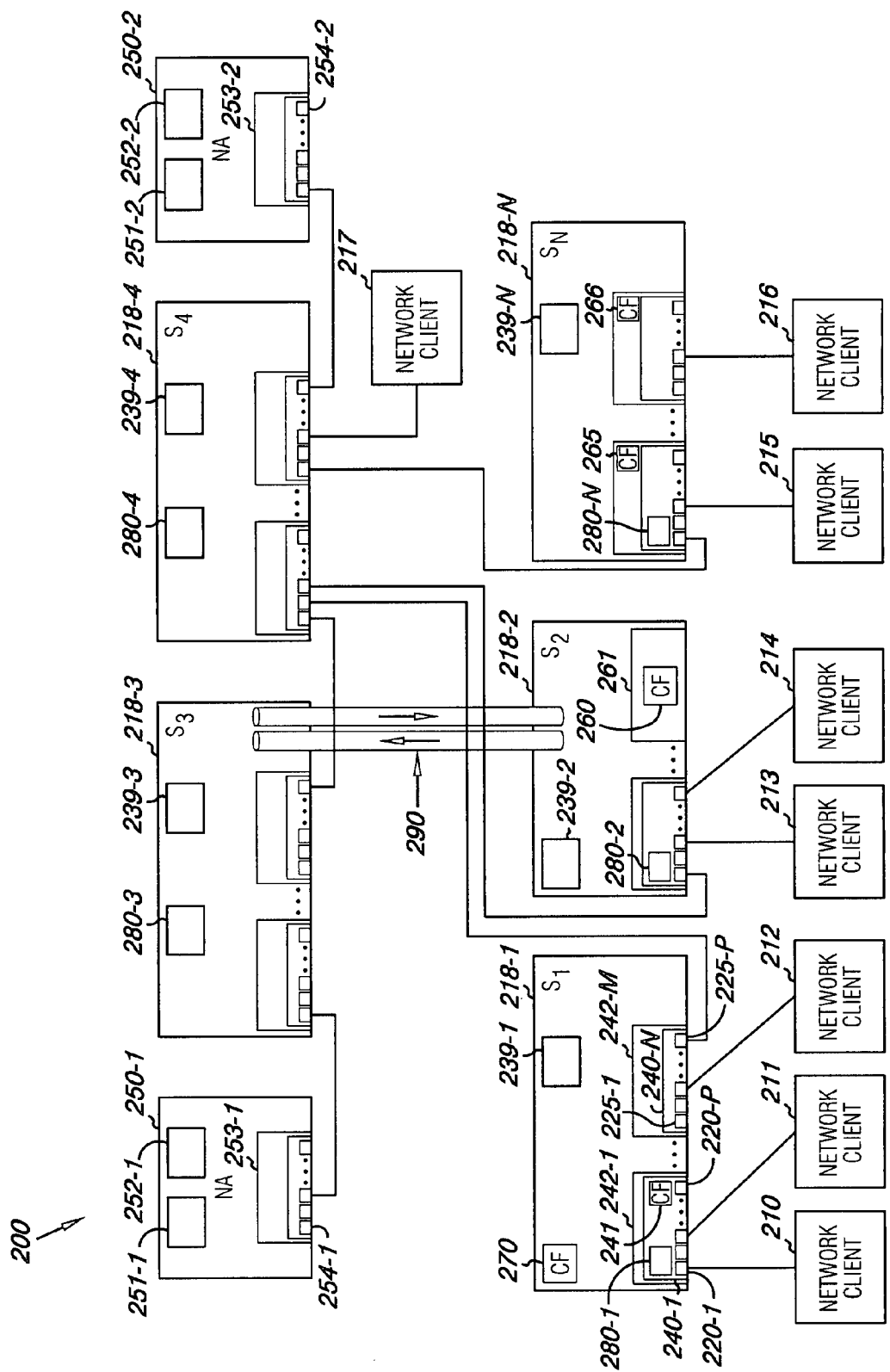
FIG. 2 illustrates a portion of a network, such as shown in FIG. 1, which includes network devices in which certain embodiments of the present invention can be implemented.

FIG. 2 illustrates a portion 200 of a network, e.g., network 100 shown in FIG. 1, including embodiments of network devices, 218-1, 218-2, ..., 218-N, e.g., "first logical entities", suited to implement embodiments of the present invention. By way of illustration and not by way of limitation, some of the network devices are "edge network devices", e.g., 218-1, having ports connected directly to network clients, 210, ..., 217. The network clients can include "fat" and "thin" clients, including mobile network clients connected through an APC 123, etc., as discussed above in connection with FIG. 1. Additionally, by way of illustration and not by way of limitation, some of the network devices are "central network devices", e.g., 218-3 which are connected to other network devices, e.g., 218-4, but which are not be connected directly to network clients, 210, ..., 217, mobile devices, etc.

As described in connection with FIG. 1, the network devices, 218-1, 218-2, ..., 218-N, of FIG. 2 can include switches, routers, hubs, etc. (shown as switches in FIG. 2). Such network devices, 218-1, 218-2, ..., 218-N, can include processor, e.g., 236-1, ..., 236-N, and memory, e.g., 238-1, ..., 238-N, resources. The network devices, 218-1, 218-2, ..., 218-N, can similarly include a number of printed circuit boards, or "blades", 242-1, ..., 242-M, which can include a number of network chips, e.g., 240-1, ..., 240-N, including logic circuitry (hardware). Each network chip, 240-1, ..., 240-N, can include a number of network ports, 220-1, 220-2, ..., 220-P to send and receive data packets (network traffic) throughout the network 200. The logic circuitry of the number of network chips, e.g., 240-1, ..., 240-N, can be in the form of an application specific integrated circuit (ASIC) and include logic to serve as a media access controller (MAC).

As shown in FIG. 2, the number of ports 220-1, 220-2, ..., 220-P can be included on a network chip 240-1, ..., 240-N and have access to logic circuitry associated with any of the network chips 240-1, ..., 240-N and to the processor 236-1, ..., 236-N and memory 238-1, ..., 238-N through a crossbar, crosslink, and/or switching fabric 239-1, ..., 239-N as the same will be understood by one of ordinary skill in the art. As used herein, the designators "M", "N", and "P" are used to illustrate that networks can have a number of network devices, that a given network device may have a number of blades, and that the network devices may support or contain a different number of ports. Embodiments are not limited to the example shown in FIG. 2.

As shown in the embodiment of FIG. 2, network appliances 250-1 and 250-2 can be connected to a network device in a centralized location. The centralized location may be connected to a central network device, e.g., 218-3 (network device not connected directly to network clients), or may be connected to an edge network device, e.g. 2184 (network device connected directly to network clients). As shown in FIG. 2, a given network appliance 250-1 can include processor 251-1 and memory 252-1 resources capable of storing and executing instructions to perform a particular role or function. The network appliance can also include one or more chips (ASICs), e.g., 253-1, having logic and a number of ports 254-1, as the same have been described above.

The network appliances 250-1 and 250-2 can serve as a checking functionality, e.g., "second logical entity." As also shown in the embodiment of FIG. 2, in some embodiments, a checking functionality (CF), e.g., "second logical entities," may be embedded, either within a network device's ASIC (e.g., 241), or on the port blades (265, 266), or just within the network device itself, either as a service or security plug-in blade (e.g., CF 260 on plug-in blade 261), or built in to the network device (e.g., 270). Embodiments of the invention are not limited to the actual location of the checking functionality with the network 200.

Although the illustration of FIG. 2 appears to illustrate one network chip, e.g., 240-1, per blade, e.g., 242-1, and two blades per network device, one of ordinary skill in the art will appreciate that a given network device 218-1 can include a number of blades, each having a number of network chips, and each chip having a number of network ports.

As described in connection with FIG. 1, the CF can be an intrusion detections system (IDS), or another diagnostic device, accounting device, counting device, etc., as may be supplied by a third party vendor of network checking devices. The checking functionality is programmed with a rule set comprising a number of complete, e.g., fully defined, rules. The complete rules of the rule set check various aspects of header fields and payload content of network packets routed to the checking functionality. For example, certain rules perform pattern matching on the header fields and the payload content. Malicious or unauthorized packets collectively produce a signature associated with their presence. Thus, threats can be identified by scanning for signatures which encompass certain threats. However, signatures may also be broad enough to encompass non-threatening packet activity, which may require further processing by the checking functionality to refine packet classification. Embodiments are not limited to the examples given here.

In the embodiment of FIG. 2, a network packet, e.g., data packet, is received by a port, e.g., 220-1, on a network device, e.g., switch 218-1, from a network client, e.g., 210. According to embodiments, the network device is configured with a subset of the number of complete, e.g., fully defined, rules of the rule set which the logic on the network device 218-1, e.g., logic associated with an ASIC of a network chip 240-1, is able to apply to received packets. The network chip 240-1 logic, e.g., first logical entity, is able to determine whether the received packet satisfies any of the number of the complete rules constituting the subset of the full rule set while processing packet header information, such as layer 2 to layer 7. In this manner, the first logical entity is able to identify coarse signatures at hardware rates as a selection algorithm. In a similar fashion, generalized selection criteria derived from commonalities of multiple rules may be used for the coarse signature search at the switch hardware level. As described in more detail next in connection with FIGS. 3A and 3B, computer executable instructions stored in memory are executed by a processor, e.g., on a network device such as network management station 112 in FIG. 1, to provide the number of complete rules of the rule set to the switch 218-1.

Figure 3A:
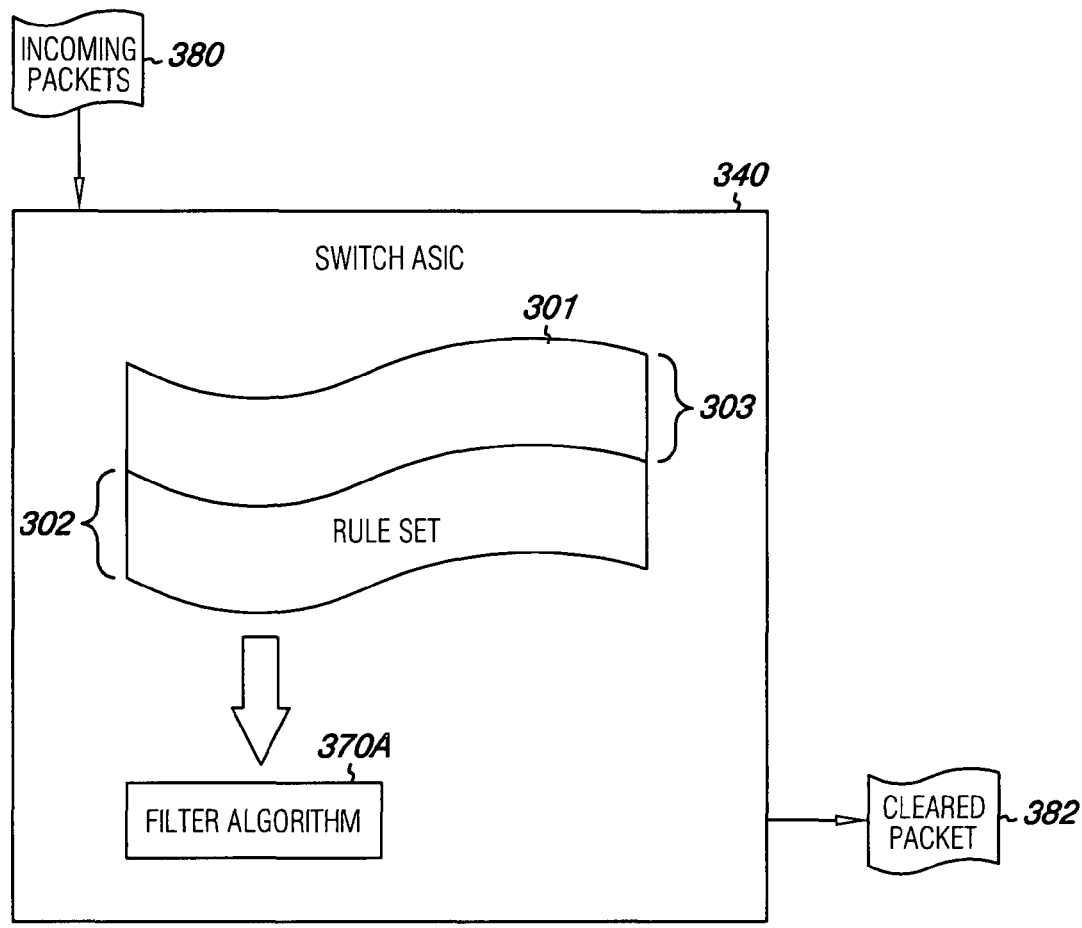
FIG. 3A illustrates one embodiment implementing a filter algorithm utilizing a subset of a rule set.

FIG. 3A illustrates one embodiment implementing a filter algorithm 370A utilizing a subset 302 of a rule set 301. For reasons described above, and in the background, the switch ASIC 340 is referred to herein as a fast processing logic plane due to the speed with which the ASIC hardware can process packet traffic.

As shown in the example embodiment of FIG. 3A, a subset 302 of the checking functionality rule set 301, e.g., IPS signatures, can be provided as an input to the filter algorithm 370A, e.g., on system boot, etc. As the reader will appreciate, the checking functionality rule set 301 includes rules that match against specific packet and/or data parameters, whereas the subset 302 includes rules that match against a subset of specific packet and/or data parameters. One having ordinary skill in the art will appreciate that scanning network traffic, e.g., incoming packets 380, for the subset 302 of the rule set 301 at the network device level, e.g., switch ASIC 340, offloads a checking functionality, e.g., checking functionality 350 in FIG. 3B, work load if the checking functionality would otherwise check traffic for the rule subset 302.

In some embodiments, ports and/or devices may be configured to only check the network traffic, e.g., incoming packets 380, for rule subset 302, and incoming packets 380 traversing the switch ASIC 340 will only be checked for rule subset 302. If a network security threat outside of rule subset 302 exists, it may be entirely missed, except that another device in the path of the packet may perform a different subset, or the full set of checks.

In various embodiments, switch ASIC 340 checks incoming packets 380 for rule subset 302 according to filter algorithm 370A. In certain embodiments, if a packet violates rule subset 302, it can be dropped. In certain embodiments, if a packet passes rule subset 302, it can be forwarded to a checking functionality, such as checking functionality 350 in FIG. 3B. In embodiments where a switch ASIC, such as switch ASIC 340 in FIG. 3A, processes a packet for rule subset 302 and forwards it to a checking functionality, such as checking functionality 350 in FIG. 3B, the checking functionality can process the packet without applying rule subset 302.

Logic on a network chip of a network device, e.g., a switch ASIC 340, is encoded with ASIC primitives to check header fields and payload content in the packets. The logic can perform pattern matching on the header fields and the payload content. In certain embodiments, the logic performs pattern matching on the header fields and the payload content according to a number of complete, e.g., fully defined, rules included in a subset of rules from among all rules offered in association with a checking functionality. In further embodiments, the logic can prioritize the application of the number of complete rules according to a hierarchy, e.g., prioritization based on most recent threat, most likely threat, most destructive threat, etc. For example, if the entire rule set includes rules 1 through 100, rules 4, 17 and 23 may constitute the rule subset deemed most important to search for at the switch ASIC level on a particular date and/or time. Thus, switch ASIC 340 checks network traffic according to this subset of complete, i.e., fully defined, rules producing the same results that otherwise would've been accomplished by a checking functionality. Applying selected complete, i.e., fully defined, rules at the switch ASIC includes checking packet content, not just evaluation of a small set of fields, e.g., packet address, according to limited functionality rules as might be implemented by access control lists (ACLs). Complete rule implementation, including packet content, is done of course, at hardware speeds and without using network bandwidth to transport the network traffic back and forth to the checking functionality.

Figure 3B:
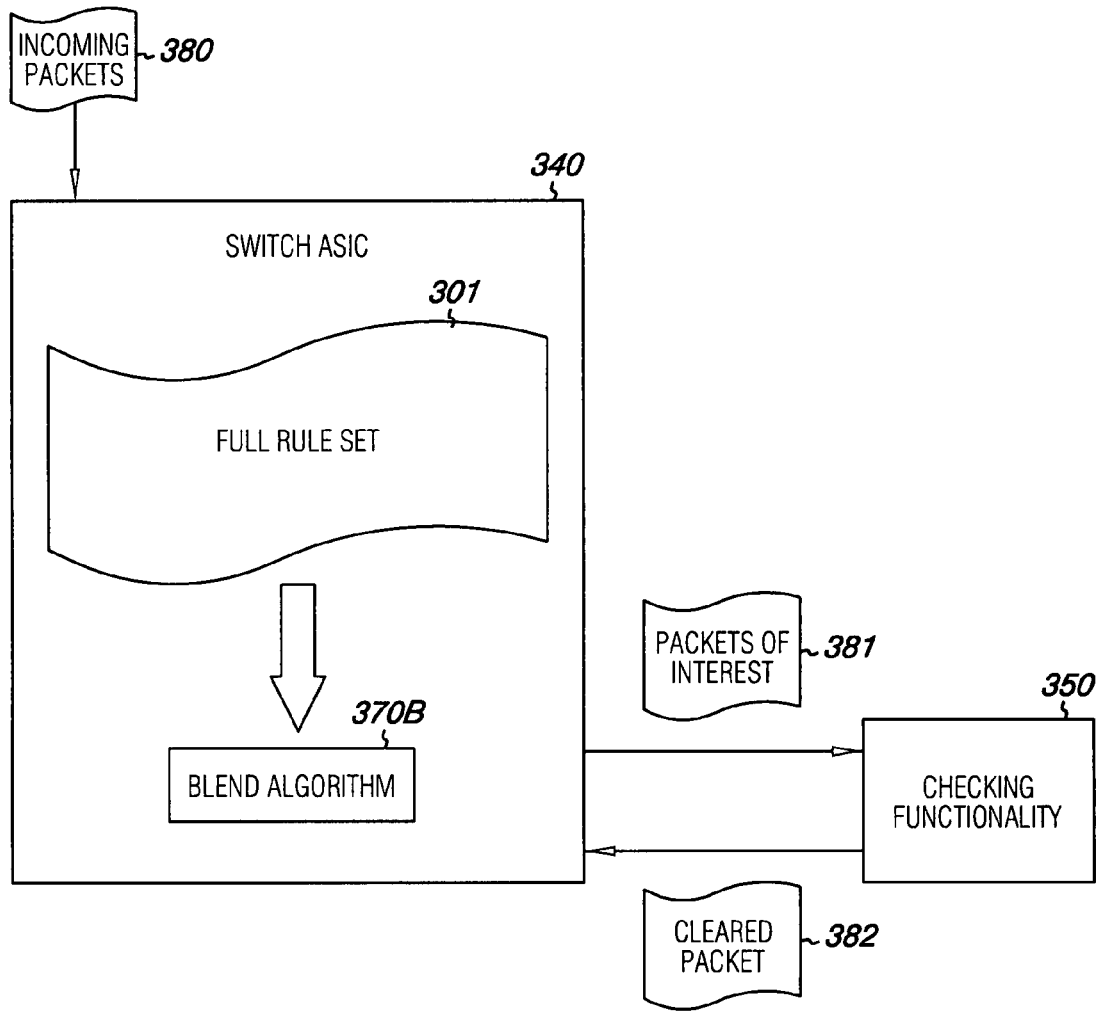
FIG. 3B illustrates one embodiment implementing a blend algorithm utilizing generalized selection criteria.

Network packets satisfying the selected rules are subjected to remedial action right at the network device, e.g., switch ASIC 340. Remedial action may include dropping packets at the switch ASIC 340. Under certain circumstances, identified packets may be forwarded to a checking functionality, such as checking functionality 350 in FIG. 3B, for further processing, with cleared packets 382 subsequently being returned to the network device as shown in FIG. 3B; however, packets need not be sent to the checking functionality to be dropped. All packets are thus checked for the selected subset of rules. However, network packets satisfying the remaining rules are not identified by the switch ASIC 340, and thus may be allowed to progress through the network with the potential of being checked with other rule subsets on other network devices. Needless to say, the greater the percentage of rules of the full rule set that can be scanned for at the switch ASIC 340 level, the greater the security. The scope and composition of the rule subset being implemented at the switch ASIC 340 level can be changed periodically, and may be date and time sensitive as threat perceptions change over time. The scope and composition of the rule subset being implemented at the switch ASIC 340 level can also be changed periodically in response to network resource availability and traffic volume. Rapid update of the rule subset is contemplated by the present invention to keep the selected rule subset relevant to the real-time threat risk.

The logic can dynamically adjust which complete rules are included in the subset of rules and the hierarchy in which the subset of rules is applied to packets, or these dynamic adjustments can be implemented by a filter algorithm executed elsewhere. Furthermore, the logic is operable to apply a remedial action to packets based on application of the number of complete rules in the subset of rules, and need not forward the packets to the checking functionality for remediation. Remediation on the switch includes, but is not limited to, dropping a packet or packets, rate limiting certain packets, or sending identified packets to a remediation VLAN, e.g., to a checking functionality with a more refined or differently-scoped rule set, i.e., need not be the original full rule set from which the rule subset was selected.

When a virus outbreak is detected, at a particular switch or in general by other network security devices, switches are updated rapidly, e.g., the rule subset being scanned at switch ASICs 340 are updated to search for the threat as accurately as possible according to the given full rule set. No human intervention is required to re-select the rule subset in response to the perceived threat or outbreak.

Switches deployed across the network may be of different vintage and/or have differing capabilities. Switch capabilities may change over time as well, due to upgrades in software, addition of additional hardware, or replacement of components, etc. Therefore, the scope and/or composition of a subset of the full rule set need not be identical at every switch, and may be customized to a particular switch, and between a particular switch and a particular checking functionality. Again, the composition and/or scope of the rule subset may be dynamically updated, for example as a particular switch is upgraded, or as a particular switch is associated with a particular checking functionality.

FIG. 3B illustrates one embodiment implementing a blend algorithm 370B utilizing generalized selection criteria. As described above, the switch 340 is referred to herein as a fast processing logic plane. In contrast, the checking functionality 350 performing its higher order, and/or more precise, packet analysis functionality according to the full rule set, e.g., pattern matching capabilities, is referred to herein as a slower processing logic plane than the switch ASICs.

According to embodiments, the network device is configured with a number of pre-conditions which the logic on the network device, e.g., switch ASIC 340, is able to apply to incoming packets 380. The switch ASIC 340, e.g., first logical entity, is able to determine whether an incoming packet 380 matches the number of pre-conditions while processing packet header information, such as layer 2 to layer 7.

As shown in the example embodiment of FIG. 3B, a blend algorithm 370B is derived from rule set 301, e.g., IPS signatures, which can be provided as an input to the blend algorithm 370B, e.g., on system boot, etc. As the reader will appreciate, the rule set 301 includes rules that match against specific packet and/or data parameters, e.g., fine signatures, whereas the blended algorithm 370B includes rules that are more inclusive in matching against one or more rules of the rule set with respect to specific packet and/or data parameters, e.g., coarse signatures. As will be appreciated by the reader, this broader search criteria may produce a higher rate of false positive identifications. For example, if a rule, or rules of the full rule set 301 include a search for the words "REVERSION," and "SUBVERSION," the blended algorithm 370B can generalize a search for "VERSION," selecting all traffic containing the string V-E-R-S-I-O-N, including words such as INVERSION and DIVERSION. The generalized selection criteria from the blended algorithm 370B is over inclusive, i.e., broader. Letter strings, placement of certain words in proximity to one another, and other pattern recognition may be used to develop the generalized selection criteria corresponding to the rules of the full rule set.

The generalized selection criteria from the blended algorithm 370B can establish a number of pre-conditions which must be met before diverting packets to a checking functionality 350 for processing packets at higher orders of analysis, such as more precise data content matching according to the full rule set, will be invoked. The number of pre-conditions can also include a number of criteria, such as an IP flow of packets. As the reader will appreciate an IP flow is identified by a source IP address and a destination IP address, e.g. a pair of IP addresses. In some embodiments the number of pre-conditions provided as an input to the blend algorithm include information specifying a physical source port, a source media access controller (MAC_SA) address, a destination media access controller (MAC_DA) address, a source IP address (IP SA), a destination IP address (IP DA), a protocol ("traffic") type, a TCP/UDP source port number, a TCP/UDP destination port number, an IP flow; a source VLAN, a port being connected to a wireless network, etc.

Incoming packet 380 content is scanned at the switch ASIC 340 level. From the full set of rules 301, commonalities are derived, e.g., generalized selection criteria from blended algorithm 370B, and a search is made of traffic at the switch ASIC 340 for the commonalities, e.g., blended algorithm 370B, as a coarse signature search.

In some embodiments of the present invention, the logic is encoded with ASIC primitives which provide a blend of rules to apply to packets according to a number of commonalities from among all rules offered in association with a checking functionality 350. In general, the blend of rules applied to packets according to the number of commonalities from among all rules of the entire rule set are broader generalized selection criteria, e.g., pre-conditions. For example, logic on a network chip of a network device, e.g., a switch, can perform pattern matching on the header fields and the payload content according to the number of commonalities in the blend of rules. The logic, the blend algorithm 370B, or some other computing process, can dynamically adjust the blend of rules applied to packets. The logic is operable forward packets which satisfy the blend of rules, e.g., packets of interest 381, to a checking functionality 350. If the checking functionality 350 does not identify a network security concern with a packet, e.g., cleared packet 382, it can clear the packet and return it to a network device. One skilled in the art will appreciate that scanning for security threats at the switch hardware level according to the a dynamic subset of rules results in a faster process than is achieved by a conventional ACL and software-based IPS devices doing content scans on a full rule base.

Figure 4:
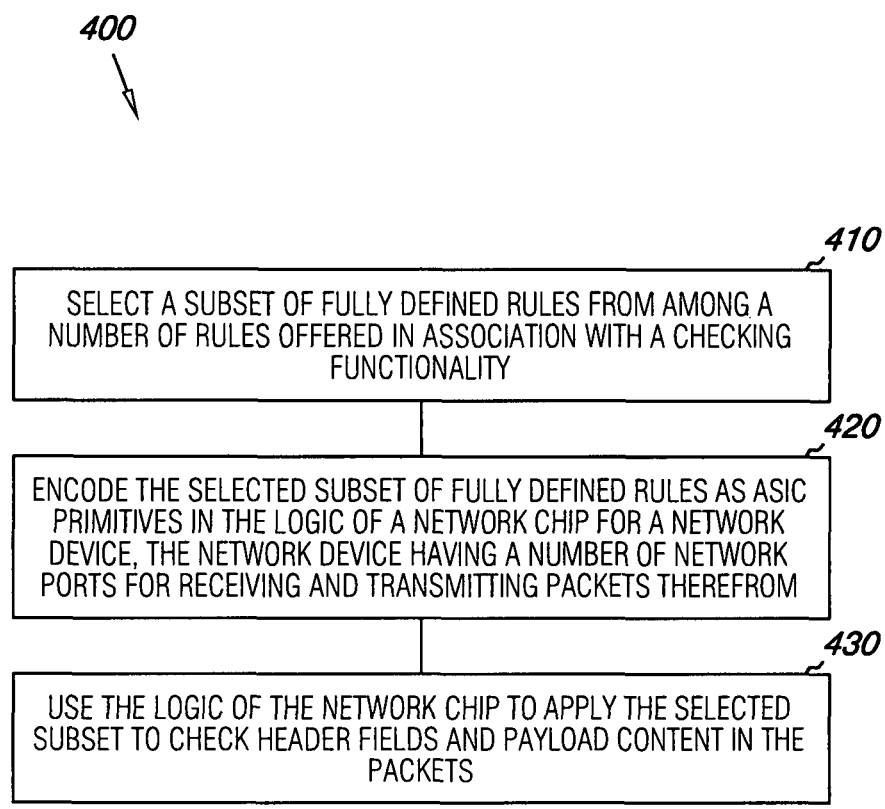
FIG. 4 illustrates a method for packet monitoring selecting a subset of fully defined rules according to an embodiment of the present invention.

FIG. 4 illustrates a method for packet monitoring 400 according to an embodiment of the present invention. As shown in the embodiment of FIG. 4 at block 410, the method includes selecting a subset of fully defined rules from among a number of rules offered in association with a checking functionality. At block 420, the method includes encoding the selected subset of fully defined rules as ASIC primitives in the logic of a network chip for a network device, the network device having a number of network ports for receiving and transmitting packets therefrom. The method further includes using the logic of the network chip to apply the selected subset to check header fields and payload content in the packets, as shown at block 430. Software and/or logic, which is operable to perform the method described in connection with FIG. 4 can be present in whole or in part in embodiments of other figures. Embodiments, however, are not limited to the example given herein.

According to further embodiments of the present invention, selecting the subset of fully defined rules can include dynamically adjusting the selected subset of rules according to rules of interest at a particular point in time, and dynamically adjusting the selected subset can include adding and removing rules in the subset, and prioritizing application of the selected subset of fully defined rules according to a hierarchy. Logic of the network chip may be used to enforce a remedial action on packets based on application of the selected subset.

Figure 5:
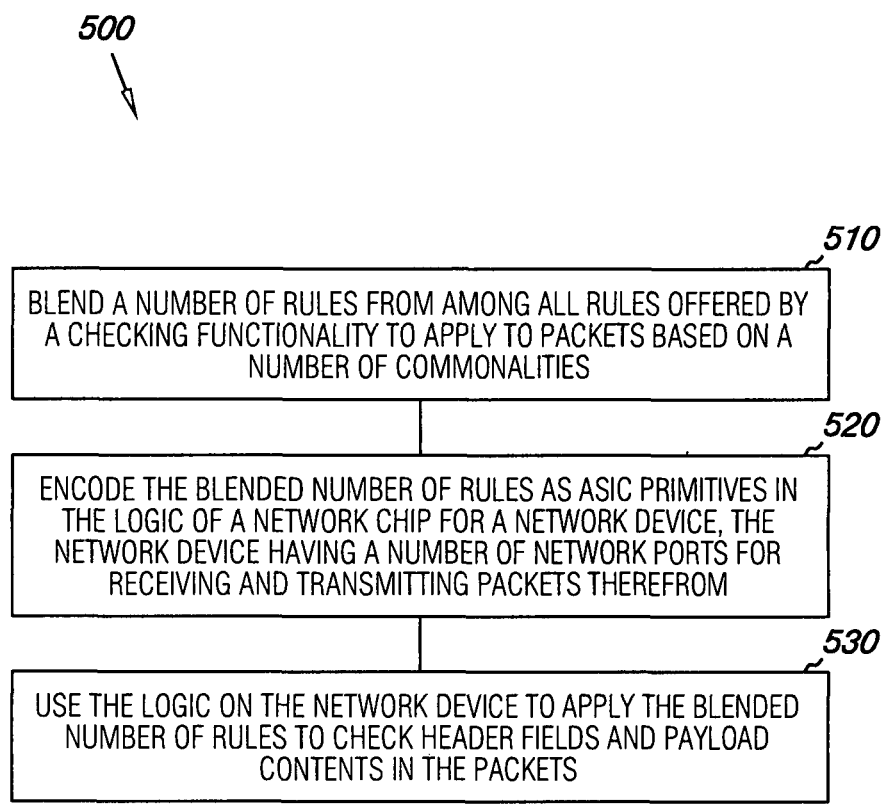
FIG. 5 illustrates a method for packet monitoring blending a number of rules according to an embodiment of the present invention.

FIG. 5 illustrates a method for packet monitoring 500 according to another embodiment of the present invention. As shown in the embodiment of FIG. 5 at block 510, the method includes blending a number of rules from among all rules offered by a checking functionality to apply to packets based on a number of commonalities. The method further includes encoding the blended number of rules as ASIC primitives in the logic of a network chip for a network device having a number of network ports for receiving and transmitting packets therefrom, as shown at block 520. At block 530, the method includes using the logic on the network device to apply the blended number of rules to check header fields and payload contents in the packets.

In some embodiments of the present invention, blending the number of rules includes blending the number of rules from among all rules offered by an intrusion prevention system (IPS). In certain embodiments of the present invention, applying the blended number of rules includes applying the blended number of rules to pattern match on the header fields and the payload contents based on the number of commonalities in the blend of rules. In addition, embodiments of the present invention may include blending the number of rules according to a first number of commonalities of interest at a first point in time, and/or dynamically adjusting the blended number of rules according to a second number of commonalities of interest at a second point in time, and/or applying the blended number of rules to all packets in a manner that is inclusive of packets which are false positives to unblended rules from among all rules offered by a checking functionality and forwarding packets which satisfy the blended number of rules to the checking functionality.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of some embodiments of the disclosure, except to the extent limited by the prior art.

In the foregoing Detailed Description, some features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network device, comprising:
a network chip including logic and a number of network ports for the device for receiving and transmitting packets therefrom; and
a checking functionality implementing a number of rules that have been selected for said checking functionality to apply to filter packets being processed by said network device;
wherein the logic comprises an application specific integrated circuit (ASIC) that is encoded with a smaller number of criteria that represent a reduction of said number of selected rules, said smaller number of criteria to be applied by said ASIC to check header fields and payload content in the packets;
wherein said logic selectively transmits packets to said checking functionality based on said smaller number of criteria derived from said number of selected rules; and
wherein the ASIC implements a blend of rules to apply to packets according to a number of commonalities from among all of said selected rules implemented by said checking functionality.

2. The device of claim 1, wherein the logic can perform pattern matching on the header fields and the payload content.

3. The device of claim 1, wherein the logic performs pattern matching on the header fields and the payload content according to a number of complete rules included in a subset of rules from among all of said selected rules implemented by said checking functionality.

4. The device of claim 3, wherein the logic can prioritize the application of the number of complete rules according to a hierarchy.

5. The device of claim 4, wherein the logic can dynamically adjust which complete rules are included in the subset of rules and the hierarchy in which the subset of rules is applied to packets.

6. The device of claim 5, wherein the logic is operable to apply a remedial action to packets based on application of the number of complete rules in the subset of rules.

7. The device of claim 1, wherein the logic can perform pattern matching on the header fields and the payload content according to the number of commonalities in the blend of rules from among all of said selected rules implemented by said checking functionality.

8. The device of claim 7, wherein the logic can dynamically adjust the blend of rules applied to packets.

9. The device of claim 8, wherein the logic is operable to forward packets which satisfy the blend of rules to said checking functionality.

10. A method for packet monitoring, comprising:
selecting a first subset of rules from among a number of rules selected for implementation by a checking functionality to apply to filter packets being processed by a first network device, said first subset comprising fewer rules than said number of rules implemented by said checking functionality; and
encoding the selected first subset of rules as ASIC primitives in logic of a network chip for the first network device, the first network device having a number of network ports for receiving and transmitting packets therefrom, to apply the selected first subset of rules as a smaller number of criteria that represent a reduction of said number of selected rules, to check header fields and payload content in the packets,
wherein said logic transmits packets to said checking functionality based on said smaller number of criteria derived from said number of rules selected, and
wherein the ASIC implements a blend of rules to apply to packets according to a number of commonalities from among all of said selected rules implemented by said checking functionality.

11. The method of claim 10, wherein selecting the subset of rules includes dynamically adjusting the selected subset of rules according to rules of interest at a particular point in time.

12. The method of claim 11, wherein dynamically adjusting the selected subset includes adding and removing rules in the subset, and prioritizing application of the selected subset of rules according to a hierarchy.

13. The method of claim 12, wherein the method includes using the logic of the network chip to enforce a remedial action on packets based on application of the selected subset.

14. The method of claim 10, further comprising:
selecting a second subset of rules from among said number of rules offered in association with said checking functionality;
encoding the second subset of rules as ASIC primitives in logic of a network chip for a second network device, the second network device having a number of network ports for receiving and transmitting packets therefrom;
transmitting packets from said first network device that do not satisfy any of said first subset of rules to said second network device; and using the logic of said second network device to apply the second selected subset of rules to check header fields and payload content in the packets received from the first network device.

15. A method for packet monitoring, comprising:
blending a number of rules from among all rules offered by a checking functionality to apply to packets based on a number of commonalities;
encoding the blended number of rules as ASIC primitives in the logic of a network chip for a network device, the network device having a number of network ports for receiving and transmitting packets therefrom; and
using the logic on the network device to apply the blended number of rules to check header fields and payload contents in the packets;
wherein the method includes blending the number of rules according to a first number of commonalities of interest at a first point in time, and dynamically adjusting the blended number of rules according to a second number of commonalities of interest at a second point in time.

16. The method of claim 15, wherein blending the number of rules includes blending the number of rules from among all rules offered by an intrusion prevention system (IPS).

17. The method of claim 15, wherein applying the blended number of rules includes applying the blended number of rules to pattern match on the header fields and the payload contents based on the number of commonalities in the blend of rules.

18. The method of claim 15, wherein the method includes:
applying the blended number of rules to all packets in a manner that is inclusive of packets which are false positives to unblended rules from among all rules offered by a checking functionality; and
forwarding packets which satisfy the blended number of rules to the checking functionality.

* * * * *